（12) United States Patent
Kudo

(10) Patent No.: US 11,577,695 B2
(45) Date of Patent: Feb. 14, 2023

(54) MOVABLE BODY

(71) Applicant: HONDA MOTOR CO., LTD., Tokyo (JP)

(72) Inventor: Seiji Kudo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 661 days.

(21) Appl. No.: 16/675,584

(22) Filed: Nov. 6, 2019

(65) Prior Publication Data

US 2020/0198582 A1  Jun. 25, 2020

(30) Foreign Application Priority Data

Dec. 21, 2018  (JP) .............................. JP2018-240017

(51) Int. Cl.
*B60S 1/02* (2006.01)
*B60R 11/04* (2006.01)
(Continued)

(52) U.S. Cl.
CPC .......... *B60S 1/023* (2013.01); *B60H 1/00785* (2013.01); *B60H 1/00878* (2013.01); *B60R 11/04* (2013.01); *B60R 2011/0026* (2013.01)

(58) Field of Classification Search
CPC .......... B60S 1/02; B60S 1/54; B60H 1/00878; B60H 1/00785; B60H 1/3233; B60H 1/00;
(Continued)

(56) References Cited

U.S. PATENT DOCUMENTS 4,519,443 A    5/1985  Sutoh et al.
4,956,979 A *  9/1990  Burst ................... B60H 1/3233
                                                454/150
(Continued)

FOREIGN PATENT DOCUMENTS

CN    202050553 U    11/2011
CN    106200214 A    12/2016
(Continued)

OTHER PUBLICATIONS

Japanese Office Action for Japanese Patent Application No. 2018-240017 dated Oct. 4, 2021 (partially translated).
(Continued)

*Primary Examiner* — Yuri Kan
(74) *Attorney, Agent, or Firm* — Thomas | Horstemeyer, LLP

(57) ABSTRACT

A movable body comprising a monitoring device configured to monitor a surrounding environment of the movable body through a window member, a heating device configured to heat a portion of the window member within a monitoring area of the monitoring device, an air conditioning device, and a control device, wherein operation modes of the control device include a first mode in which both the heating device and the air conditioning device are driven, and a second mode in which the driving force of the air conditioning device is smaller than that in the first mode, and the control device evaluates the degree of fog on the portion of the window member and determines one of the operation modes based on the result of evaluation.

7 Claims, 6 Drawing Sheets

(51) Int. Cl.
 *B60H 1/00* (2006.01)
 *B60R 11/00* (2006.01)
(58) Field of Classification Search
 CPC ...... G01N 27/048; G05D 1/027; H04N 7/183; F25B 29/003; H01M 8/04014; B60R 11/04
 See application file for complete search history.

(56) References Cited

U.S. PATENT DOCUMENTS

| | | | |
|---|---|---|---|
| 5,096,287 A | | 3/1992 | Kakinami |
| 9,395,538 B2 | | 7/2016 | Hui et al. |
| 10,196,041 B2 | | 2/2019 | Mori et al. |
| 10,351,073 B2 | | 7/2019 | Usami et al. |
| 10,506,145 B2 | | 12/2019 | Takama et al. |
| 10,640,090 B2 | | 5/2020 | Adachi et al. |
| 11,007,980 B2 | | 5/2021 | Oikawa |
| 2006/0270333 A1 | * | 11/2006 | Hirai .................. B60H 1/00785 454/75 |
| 2013/0087305 A1 | * | 4/2013 | Ikeya ................ H01M 8/04014 165/41 |
| 2016/0091714 A1 | | 3/2016 | Hui et al. |
| 2016/0339767 A1 | * | 11/2016 | Enomoto ............. F25B 29/003 |
| 2017/0240138 A1 | * | 8/2017 | Mori ..................... H04N 7/183 |
| 2017/0257536 A1 | | 9/2017 | Takama et al. |
| 2017/0332010 A1 | * | 11/2017 | Asakura ................ G05D 1/027 |
| 2017/0334364 A1 | | 11/2017 | Usami et al. |
| 2018/0056942 A1 | | 3/2018 | Oikawa |
| 2018/0117988 A1 | * | 5/2018 | Sarnia .................. G01N 27/048 |
| 2018/0229690 A1 | | 8/2018 | Adachi et al. |
| 2020/0198548 A1 | * | 6/2020 | Ohtaki ...................... B60S 1/54 |
| 2020/0198583 A1 | * | 6/2020 | Kudo ................. B60H 1/00878 |
| 2021/0229635 A1 | | 7/2021 | Oikawa |

FOREIGN PATENT DOCUMENTS

| | | | | |
|---|---|---|---|---|
| CN | 106457965 A | * | 2/2017 | ............ B60R 11/04 |
| CN | 107097755 A | | 8/2017 | |
| CN | 107153316 A | | 9/2017 | |
| CN | 108454576 A | | 8/2018 | |
| DE | 102013219090 A1 | | 4/2015 | |
| DE | 112015000103 T5 | * | 4/2016 | ......... B60H 1/00785 |
| JP | S5777210 A | | 5/1982 | |
| JP | S6181216 A | * | 4/1986 | ............. B60H 1/00 |
| JP | H03-266739 A | | 11/1991 | |
| JP | 2001-088611 A | | 4/2001 | |
| JP | 2004-112329 A | | 4/2004 | |
| JP | 3817357 B2 | * | 9/2006 | ............. B60H 1/00 |
| JP | 2014061799 A | | 4/2014 | |
| JP | 2014-101004 A | | 6/2014 | |
| JP | 2015-155279 A | | 8/2015 | |
| JP | 2017-206098 A | | 11/2017 | |

OTHER PUBLICATIONS

Chinese Office Action issued for Chinese Patent Application No. 201911087470.5 dated Oct. 21, 2022 (with Partial Translation).

* cited by examiner

FIG. 5

| DEGREE OF FOG (EVALUATION VALUE) | HEATING DEVICE | AIR CONDITIONING DEVICE |
|---|---|---|
| SMALL | OFF | OFF |
| RELATIVELY SMALL | ON (LOW) | OFF |
| MIDDLE | ON | OFF |
| RELATIVELY LARGE | ON | ON (LOW) |
| LARGE | ON | ON |

MOVABLE BODY

CROSS-REFERENCE TO RELATED APPLICATION

This application claims priority to and the benefit of Japanese Patent Application No. 2018-240017 filed on Dec. 21, 2018, the entire disclosure of which is incorporated herein by reference.

BACKGROUND OF THE INVENTION

Field of the Invention

The present invention particularly relates to a movable body that is provided with a monitoring device.

Description of the Related Art

Some vehicles are provided with a camera inside the vehicles, which serves as a monitoring device that can monitor the surrounding environment (see Japanese Patent Laid-Open No. 2017-206098). Such a camera is provided on the side of the inner wall of the windshield, and makes it possible to monitor the outside of the vehicle through the windshield. Japanese Patent Laid-Open No. 2017-206098 discloses that a heater that is constituted by an electric heating wire is provided as a heating device together with a camera, in order to remove fog on the windshield, such as condensation, frost, or ice.

The above-described configuration is desired to be further improved in terms of controllability, in order to effectively remove fog (fog removal) or prevent fog from being generated (fog prevention). On the other hand, an air conditioning device may be driven in order to effectively realize fog removal/fog prevention. However, the driving of an air conditioning device may cause the occupant discomfort, which should be taken into consideration. The same applies not only to terrestrial vehicles, but also to ships, for example.

SUMMARY OF THE INVENTION

The present invention makes it possible to effectively and relatively easily realize fog removal and fog prevention.

One of the aspects of the present invention provides a movable body comprising a monitoring device configured to monitor a surrounding environment of the movable body through a window member that is light-transmissive and defines the inside and the outside of the movable body, a heating device configured to heat a portion of the window member within a monitoring area of the monitoring device, an air conditioning device configured to perform air conditioning in the movable body, and a control device configured to perform drive control on the heating device and the air conditioning device, wherein operation modes of the control device include a first mode in which both the heating device and the air conditioning device are driven, and a second mode in which the driving force of the air conditioning device is smaller than that in the first mode, and the control device evaluates the degree of fog on the portion of the window member, and determines one of the operation modes based on the result of evaluation.

Further features of the present invention will become apparent from the following description of exemplary embodiments with reference to the attached drawings.

BRIEF DESCRIPTION OF THE DRAWINGS

FIG. 5 is a diagram illustrating an example of drive control that is performed on a heating device and an air conditioning device.

DESCRIPTION OF THE EMBODIMENTS

Figure 1:
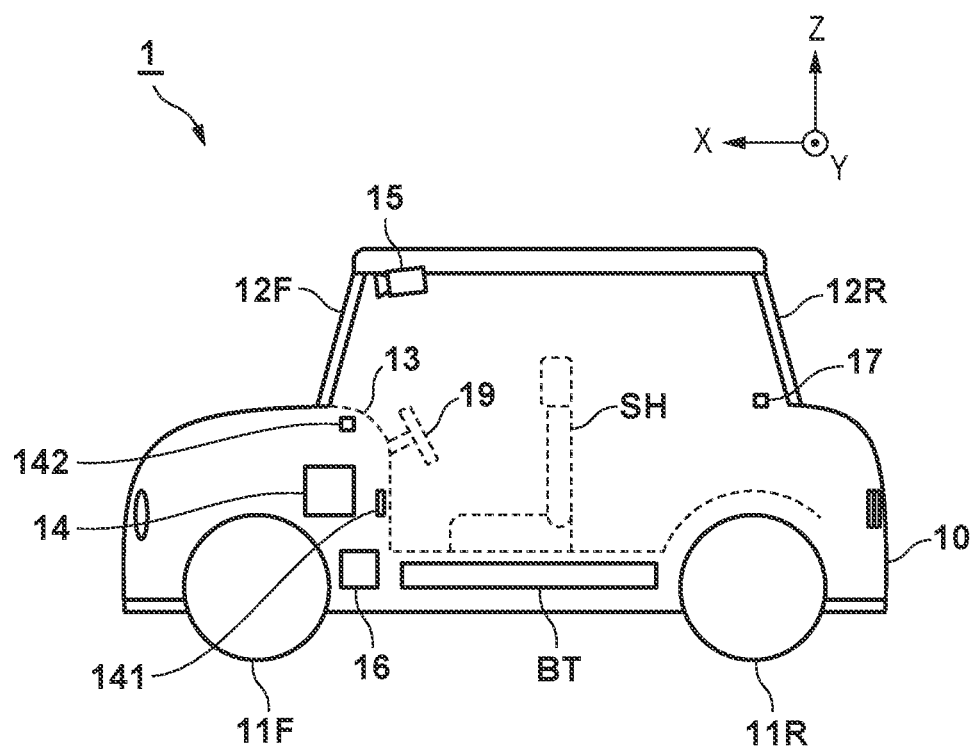
FIG. 1 is a schematic diagram illustrating an example of a configuration of a vehicle according to an embodiment.

The following describes an embodiment of the present invention with reference to the accompanying drawings. Note that each of the drawings is a schematic diagram showing a structure or a configuration of the embodiment, and each of the members in the drawings is not necessarily drawn to scale. Also, in each of the drawings, the same members or the same constituent elements are assigned the same reference numerals, and descriptions of duplicate contents are omitted.

FIG. 1 is a schematic diagram showing a vehicle 1 according to an embodiment. In order to facilitate understanding of a structure, an X axis, a Y axis, and a Z axis that are orthogonal to each other are shown in the drawings (the same applies to the other drawings described below). The X direction corresponds to the longitudinal direction of the vehicle body, the Y direction corresponds to the left-right direction of the vehicle body, or the vehicle width direction, and the Z direction corresponds to the height direction of the vehicle body. In the present description, expressions such as front/rear, left/right (side), top/bottom, and inside/outside of the vehicle body (vehicle interior/exterior) indicate a positional relationship relative to a vehicle body 10.

The vehicle 1 is a four-wheeled vehicle that is provided with a pair of left and right front wheels 11F and a pair of left and right rear wheels 11R, but the number of wheels is not limited to four. Also, the vehicle 1 is an electric vehicle that is provided with a battery BT, but may be additionally provided with an internal-combustion engine. A secondary battery such as a lithium ion battery is used as the battery BT, and the battery BT stores electric power that is to be supplied to elements corresponding thereto in the vehicle 1.

The vehicle 1 also includes window members 12F and 12R that define the inside and the outside of the vehicle. The window members 12F and 12R may be constituted by a light-transmissive material (such as glass or resin). In the drawing, the window member 12F is shown as a windshield, a front window, or a front glass, and the window member 12R is shown as a rear window or a rear glass. However, other window members such as a side window or a side glass may also be provided. In this example, a seat SH is shown in the cabin as a driver's seat in order to simplify the drawing. However, other seats may be additionally provided in the cabin.

An operation unit 19 that is used by a user (in particular, a driver) to input a predetermined operation is provided in a cabin front structure 13 that includes a dashboard panel and so on. In the drawing, a steering wheel is shown as a typical example of the operation unit 19. However, the concept of operation that is to be input to the operation unit 19 includes, in addition to a driving operation, related operations that directly/indirectly accompany the driving operation. An example of the related operations is an air conditioning management operation in the cabin.

In addition, as shown in FIG. 1, the vehicle 1 also includes an air conditioning device 14, an electronic component 15, and a control device 16. A well-known configuration may be applied to the air conditioning device 14. For example, the air conditioning device 14 includes an evaporator, a compressor, a condenser, a pipe that connects them and provides a refrigerant flow path, various valves that are provided on the flow path, and so on. The air conditioning device 14 also includes a blower fan that generates a predetermined airflow as conditioned air, a fan motor that drives the blower fan, a heater core that heats the conditioned air, and so on.

The air conditioning device 14 also includes an air conditioner duct 141, a defroster duct 142, and a door mechanism (e.g. a plate door or a rotary door) for switching between them to send out the conditioned air from one of them. The defroster duct 142 is an outlet via which conditioned air is sent out toward the window member 12F/conditioned air is blown against the window member 12F, and a main objective thereof is to perform fog removal/fog prevention on the window member 12F. The air conditioner duct 141 in this example is an outlet other than the above-described defroster duct 142, and a main objective thereof is to perform air conditioning management in the cabin. Therefore, it can be expressed that the air conditioning device 14 includes a cabin blower for sending out air from the air conditioner duct 141, and a fog removal/fog prevention blower (a defroster device) for sending out air from the defroster duct 142. Although the drawing shows a single air conditioner duct 141 that is provided in the cabin front structure 13, a plurality of air conditioner ducts 141 are typically provided so as to be able to send out conditioned air to the user or the surroundings of the user (e.g. rearward or rearward and downward).

The user can activate/deactivate the air conditioning device 14 by inputting an operation to the operation unit 19. The user can select one of the ducts 141 and 142 in the air conditioning device 14 in an active state, from which conditioned air is to be sent out, by inputting an operation to the operation unit 19. For example, the user can input a predetermined operation to the operation unit 19 so that conditioned air is sent out from one or both of the ducts 141 and 142. Also, the driving force of the air conditioning device 14 (the amount of conditioned air) can be adjusted by the user inputting an operation to the above-described operation unit 19, and can also be adjusted by the control device 16 executing a predetermine program, the details of which will be described below.

Figure 2A:
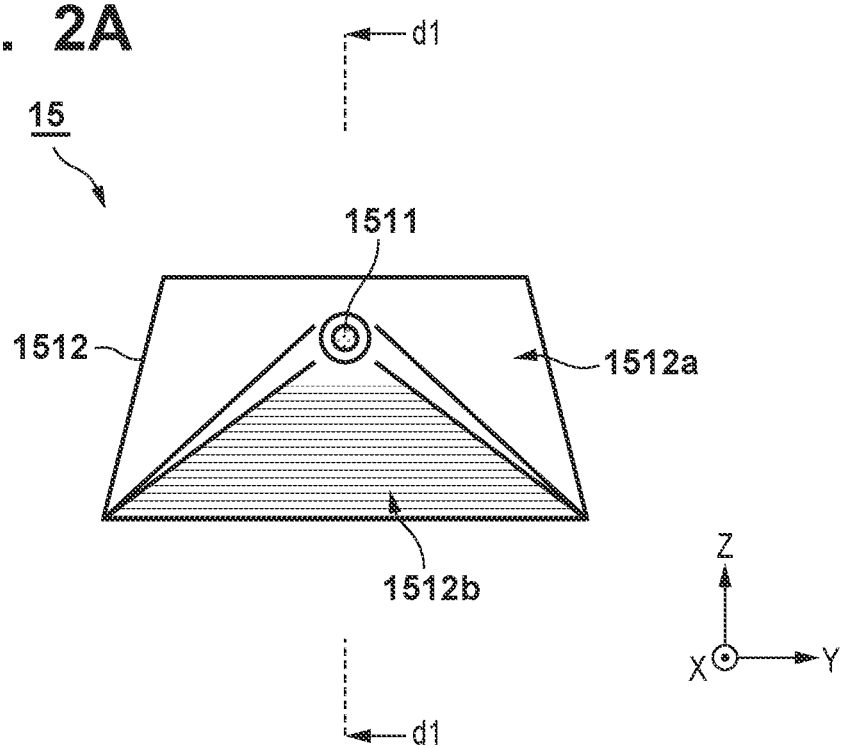
FIG. 2A is a schematic diagram illustrating an example of a configuration of an on-board electronic component.
Figure 2B:
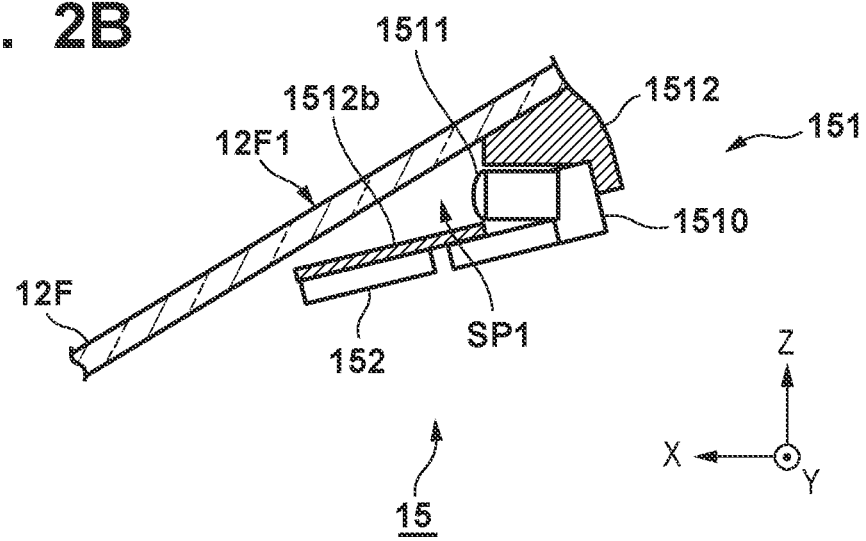
FIG. 2B is a schematic diagram illustrating an example of a configuration of an on-board electronic component.

FIG. 2A is a front view showing a configuration of the electronic component 15. FIG. 2B is a cross-sectional view of the electronic component 15 taken along a cutting line di-di in FIG. 2A. The electronic component 15 includes a monitoring device 151 that can monitor the surrounding environment of the self-vehicle through the window member 12F and a heating device 152 that can heat the window member 12F, and the electronic component 15 is provided in the vicinity of the inner wall (the surface inside the vehicle) of the window member 12F.

A camera that can capture an image of the above-described surrounding environment can be used as the monitoring device 151. In the present embodiment, the monitoring device 151 includes a device body 1510, a detector 1511, and a base member 1512. A well-known imaging sensor such as a CCD/CMOS image sensor is used as the detector 1511, and the detector 1511 makes it possible to detect or capture an image of the above-described surrounding environment (in the present embodiment, the environment in front of the vehicle 1). A processor that processes the result of detection performed by the detector 1511 is built into the device body 1510, and the result of processing performed by the processor is output to the control device 16 described below as image data.

The base member 1512 is a bracket for fixing the above-described device body 1510 and detector 1511 to the vehicle body 10, and fixing the heating device 152 described below. The base member 1512 includes an abutting portion 1512a and a recessed portion 1512b. The abutting portion 1512a abuts against the inner wall of the window member 12F, and is fixed to the window member 12F using an adhesive, for example.

The recessed portion 1512b is recessed in the abutting portion 1512a, and has a substantially triangular or trapezoidal shape in a top view or a front view thereof. An opening is provided at the rear end of the recessed portion 1512b, through which the detection surface of the detector 1511 is exposed to the outside. That is to say, the recessed portion 1512b of the base member 1512 faces the inner wall of the window member 12F, a space SP1 is formed between the base member 1512 and the window member 12F. The detection surface of the detector 1511 is located in the space SP1. As can be seen from FIG. 2B, the space SP1 is formed so as to narrow in a direction from the rear side to the front side in side view.

With such a configuration, the monitoring device 151 can monitor the surrounding environment (in the present embodiment, the environment in front of the vehicle 1) through the window member 12F. Note that surface treatment may be applied to the upper surface of the recessed portion 1512b in order to prevent light reflection.

A portion of the window member 12F located in the monitoring area (and the neighboring area thereof) of the monitoring device 151 is referred to as a portion 12F1. In the present embodiment, the portion 12F1 corresponds to a portion that is forward of, and upward of, the above-described space SP1. Here, as described above, an opening, through which the detection surface of the detector 1511 is exposed to the outside, is provided in a rear portion of the recessed portion 1512b. Also, as can be seen from FIG. 2B, a gap (approximately 0.1 cm to approximately 1.0 cm) is formed between the front end of the recessed portion 1512b and the window member 12F. Therefore, the above-described space SP1 is substantially not sealed, and is in communication with the inside of the vehicle.

However, the space SP1 is surrounded by the window member 12F and the base member 1512, and therefore, in such a space SP1, a gas (air) is likely to stop flowing, and fog may be likely to be generated on the above-described portion 12F1, depending on the environment (in particular, the temperature and the humidity in the vehicle 1). Typically, such fog is generated as a result of water droplets or the like adhering to the portion 12F1 when the humidity in the cabin is relatively high and the temperature of the window member 12F is relatively low.

The heating device 152 is provided on the recessed portion 1512b of the base member 1512, and heats the above-described portion 12F1 via the gas (air) in the space SP1. Additionally, when the air conditioning device 14 is in an active state, a gas that flows into the space SP1 through the gap between the front end of the recessed portion 1512b and the window member 12F is heated by the heating device 152, and thus heats the above-described portion 12F1. In this way, the heating device 152 removes fog on the above-described portion 12F1, and/or prevents fog from being generated on the above-described portion 12F1 (this may be simply referred to as "fog removal/prevention" in the present description). The heating device 152 need only be configured to be able to generate a desired amount of heat. In the present embodiment, an electric heating wire that is built into the recessed portion 1512b, and a heater driver that energize the electric heating wire to generate heat, are used. The heater driver supplies the electric heating wire with a current that is based on electric power from the battery BT.

Here, if the driving force of the air conditioning device 14 (the amount of conditioned air) is increased, the amount of gas flowing into the space SP1 increases. Also, if the driving force of the heating device 152 (the amount of heat generation) is increased, the above-described portion 12F1 of the window member 12F is quickly heated via the space SP1. Therefore, from the viewpoint of fog removal/fog prevention, it can be summarized that fog removal/fog prevention can be more effectively realized by increasing the driving force of the air conditioning device 14 and/or the heating device 152.

The control device 16 in the present embodiment is an ECU (electronic control unit) that includes a CPU (central processing unit), a memory, and an external communication interface, and performs drive control on each element of the vehicle 1 based on a predetermined program. In another embodiment, a semiconductor device such as a PLD (programmable logic device) or an ASIC (application specific integrated circuit) may be used as the control device 16. That is to say, the functions of the control device 16 described in the present description can be realized by either hardware or software.

Again, as shown in FIG. 1, the vehicle 1 also includes an environment detection device 17. The environment detection device 17 is configured to be able to detect an environment inside/outside the vehicle 1. In the present embodiment, the environment detection device 17 can detect the humidity in the vehicle, which can be a main cause of fog on the window member 12F. Additionally/alternatively, the environment detection device 17 may detect the number of occupants, which may be a cause of humidity. Also, it is preferable that the environment detection device 17 can detect the temperature outside the vehicle.

Figure 3:
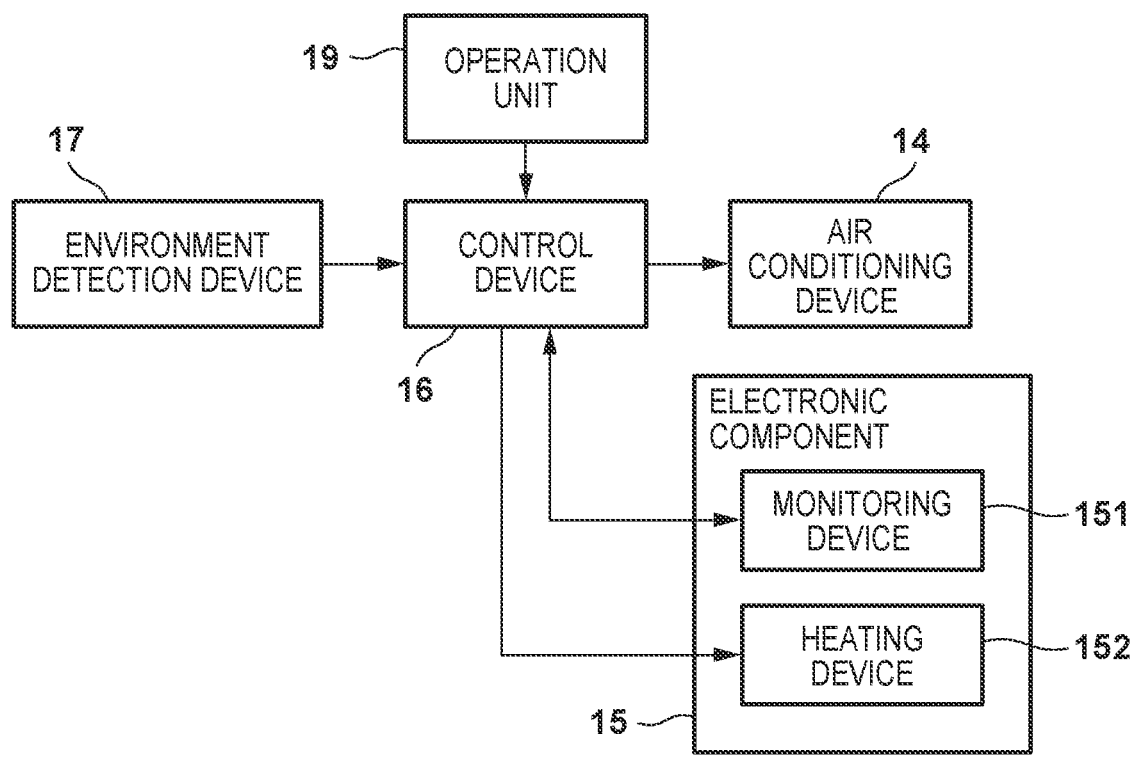
FIG. 3 is a block diagram illustrating an example of a configuration of a portion of a vehicle.

FIG. 3 is a block diagram showing a portion of the system configuration of the vehicle 1. The control device 16 transmits/receives signals to/from several elements included in the vehicle 1, and performs drive control on the elements based on an operation input by the user to the operation unit 19, for example. Also, although details will be described below, the control device 16 can perform drive control on the heating device 152 and the air conditioning device 14 based on the result of detection performed by the environment detection device 17.

For example, the control device 16 performs drive control on the air conditioning device 14. This drive control includes adjustment of the driving force of the air conditioning device 14 (the amount of conditioned air), for example. The drive control is performed based on an operation input by the user to the operation unit 19, and is also performed based on a predetermined program described below. Note that adjustment of the driving force can be realized by changing the number of rotations of the blower fan, for example.

Also, the control device 16 receives information (image data in the present embodiment) indicating the above-described surrounding environment from the monitoring device 151, and performs predetermined driving assistance based on the information. Driving assistance mentioned above is a concept that includes not only the provision of necessary/useful information for driving to the driver, but also so-called automated driving, i.e. at least one of the drive operations (typically, acceleration, braking, and steering) is performed by the control device 16, not by the driver.

Also, the control device 16 performs drive control on the heating device 152. The heating device 152 is driven by the control device 16 upon predetermined conditions being satisfied. However, the heating device 152 may be additionally driven based on an operation input by the user to the operation unit 19.

To simplify this description, the control device 16 is illustrated as a single unit in FIG. 3. However, in many cases, the control device 16 is constituted by a plurality of ECUs that are provided so as to be able to communicate with each other, and the plurality of ECUs may be provided at their respective positions in the vehicle body 10. Also, each ECU may be constituted by one or more electrical components mounted on a mounting board.

Figure 4:
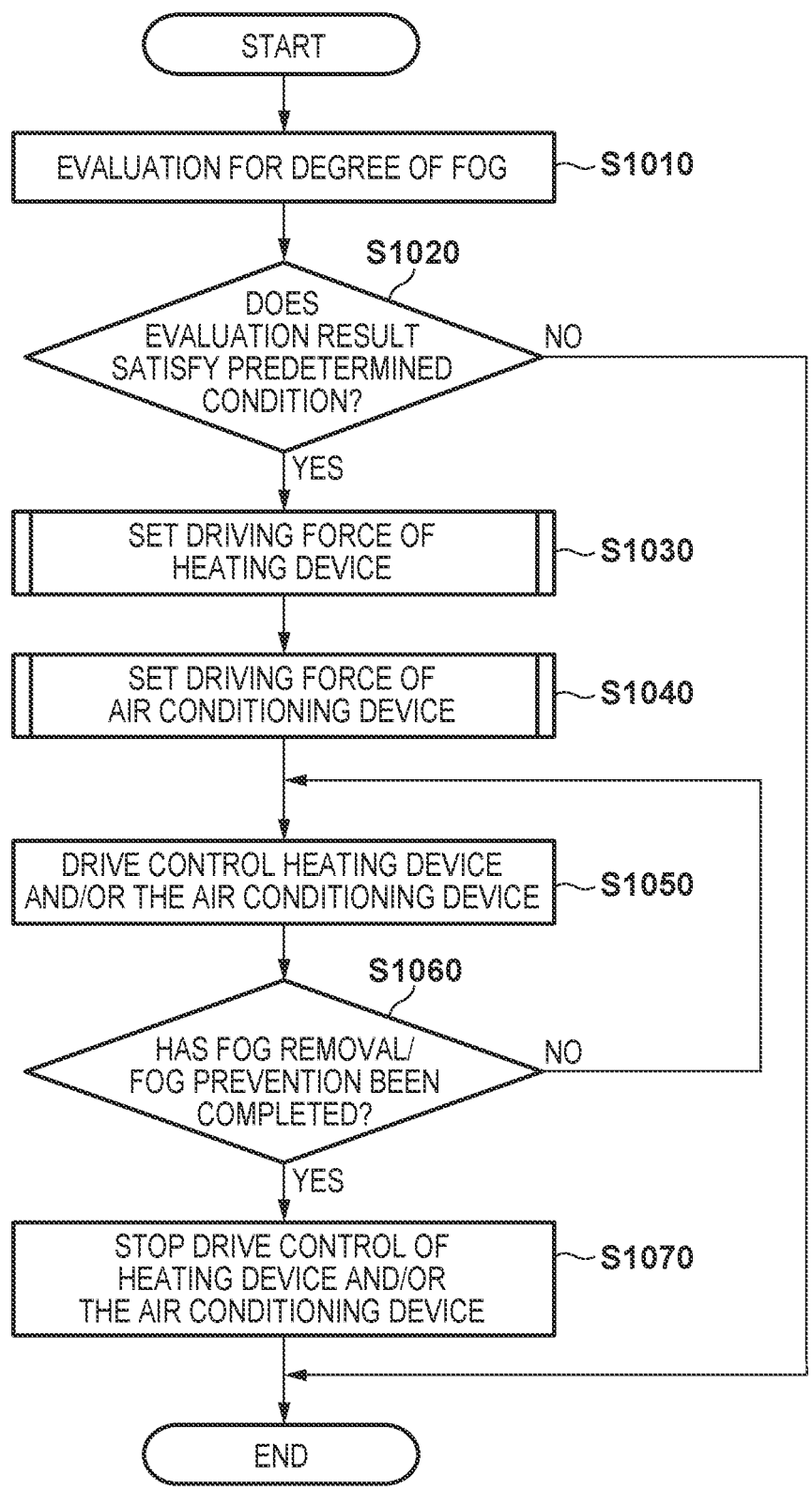
FIG. 4 is a flowchart illustrating an example of the content of control that is performed by a control device.

FIG. 4 is a flowchart showing an example of the content of control that is performed by the control device 16. In short, in this flowchart, the control device 16 has a plurality of operation modes (or control modes) for performing drive control on the heating device 152 and the air conditioning device 14, and sets one of the plurality of operation modes based on the result of evaluation regarding the degree of fog. These operations are mainly performed by the CPU in the control device 16, executing a predetermined program.

In step S1010 (hereinafter simply referred to as "S1010". The same applies to the other steps.), the degree of fog on the portion 12F1 of the window member 12F is evaluated. This evaluation includes not only an evaluation of the degree of actual fog present at the time of the evaluation (whether or not fog is actually present), but also an evaluation or prediction of the degree of fog in the relatively near future (whether or not there will be fog in the relatively near future). These evaluations may be realized using a well-known method. For example, the degree of actual fog can be evaluated by performing a predetermined image analysis on image data that is the result of monitoring performed by the monitoring device 151. Also, the degree of fog that may be generated in the relatively near future can be evaluated based on the result of detection performed by the environment detection device 17.

Although details will be described below, an evaluation value that indicates the likelihood of fog being generated on the window member 12F is generated as the result of evaluation of the above-described degree of fog. For example, a numeric value that is to be given as the evaluation value decreases in the following order: when it is determined that fog is actually present; when it is determined that fog is not actually present, but fog may be present in the relatively near future; and when it is determined that fog is not actually present and there is no possibility that fog will be present in the relatively near future. That is to say, the higher the evaluation value regarding the degree of fog (hereinafter also referred to simply as "the evaluation value") is, the higher the necessity of fog removal/fog prevention is. The evaluation value may be a numeric value, but need only express a relative relationship regarding the likelihood of fog being generated. For example, the evaluation value may be given as a predetermined code using an alphabet, a symbol, or the like.

In S1020, whether or not the result of evaluation in S1010 satisfies a predetermined condition is determined. If it has been determined that fog is actually present/fog may be present in the relatively near future, based on the result of evaluation in S1010, i.e. if the above-described evaluation value generated in S1010 is greater than a reference value, processing proceeds to S1030. On the other hand, if it has not been determined that fog is actually present/fog may be present in the relatively near future, i.e. if the above-described evaluation value is no greater than the reference value, the flowchart is terminated.

In S1030, the driving force of the heating device 152 is set based on the evaluation value generated in S1010. In S1040, as in S1030, the driving force of the air conditioning device 14 is set based on the above-described evaluation value. The greater the above-described evaluation value is (the higher the necessity of fog removal/fog prevention is), the greater the driving force of the heating device 152 and/or the air conditioning device 14 is set. For example, the driving force of the heating device 152 can be increased by increasing the amount of current to be supplied to the electric heating wire built into the recessed portion 1512b. Also, the driving force of the air conditioning device 14 can be increased by increasing the number of rotations of the blower fan. The details of the method for setting the driving forces will be described later.

In S1050, the drive control is performed on the heating device 152 and/or the air conditioning device 14. As a result of the heating device 152 being heated, the space SP1 is heated, the portion 12F1 of the window member 12F is accordingly heated, and thus fog removal/fog prevention is performed. Additionally/alternatively, as a result of the air conditioning device 14 being driven, some conditioned air flows into the space SP1, the retention of air in the space SP1 is accordingly resolved, and thus fog removal/fog prevention is performed. If both the heating device 152 and the air conditioning device 14 are driven, fog removal/fog prevention is more effectively performed.

In S1060, whether or not fog removal/fog prevention has been completed is determined. This determination may be performed using the same method as in the above-described S1010, for example, or performed based on the time elapsed after the driving of the heating device 152 has been started. The elapsed time may be a constant value, or a variable value that is based on the temperature outside the vehicle/the humidity in the vehicle. If fog removal/fog prevention has been completed, processing proceeds to S1070, and otherwise processing returns to S1050.

In S1070, drive control in S1050 (i.e. drive control performed on the heating device 152 and/or the air conditioning device 14 to realize fog removal/fog prevention) is stopped, and the flowchart is terminated. Generally, the window member 12F may include a heat-insulating layer as an intermediate layer, and therefore, once the inner wall of the window member 12F has been heated, the above-described fog is unlikely to be generated. Therefore, the above-described drive control may be stopped immediately after fog removal/fog prevention has been completed. In another embodiment, after fog removal/fog prevention has been completed, S1070 may be partially omitted (e.g. drive control may still be performed on the heating device 152), and thus the effect of fog prevention continues.

Note that the above-described flowchart may be partially modified so as not to depart from the spirit thereof. For example, another step may be added, or the order of the steps may be changed.

FIG. 5 is a table showing a correspondence relationship between the evaluation value generated in S1010 and the driving forces of the heating device 152 and the air conditioning device 14. The driving forces of the heating device 152 and the air conditioning device 14, used to perform fog removal/fog prevention, are set based on the above-described evaluation values (see S1030 to S1040).

Regarding the items of "heating device" in the drawing, "ON" indicates that the heating device 152 is to be driven (the electric heating wire built into the recessed portion 1512b is to be energized). "OFF" indicates that the heating device 152 is substantially not to be driven (the driving is to be restricted). "ON (low)" indicates that the heating device 152 is to be driven with a relatively small driving force (which is smaller than the driving force for the above-described "ON").

Similarly, regarding the item "air conditioning device" in the drawing, "ON" indicates that the air conditioning device 14 is to be driven (e.g. air is to be sent out from the defroster duct 142). "OFF" indicates that the air conditioning device 14 is substantially not to be driven (the driving is to be restricted). "ON (low)" indicates that the air conditioning device 14 is to be driven with a relatively small driving force (which is smaller than the driving force for the above-described "ON").

In the present embodiment, operation modes (or control modes) of the control device 16 that are can be employed to perform drive control on the heating device 152 and/or the air conditioning device 14 are classified into the following four modes based on the above-described evaluation value:

1) for example, if the evaluation value is "relatively small" (fog has not been generated at the time of S1010, but there is the possibility of light fog being generated in the relatively near future), the heating device is to be "ON (low)" and the air conditioning device is to be "OFF";

2) for example, if the evaluation value is "moderate" (fog has not been generated at the time of S1010, but there is the possibility of fog being generated in the relatively near future), the heating device is to be "ON" and the air conditioning device is to be "OFF";

3) for example, if the evaluation value is "relatively large" (light fog has been generated at the time of S1010, and fog removal/fog prevention needs to be performed), the heating device is to be "ON" and the air conditioning device is to be "ON (low)"; and 4) for example, if the evaluation value is "large" (fog has been generated at the time of S1010, and fog removal/fog prevention needs to be performed), the heating device is to be "ON" and the air conditioning device is to be "ON)".

Note that, if the evaluation value is "small" (there is substantially no need to perform fog removal/fog prevention at the time of S1010), the heating device is to be "OFF" and the air conditioning device is to be "OFF".

Here, in order to simplify this description, the above-described four modes are described as examples of operation modes of the control device 16 that are employed to perform drive control on the heating device 152 and/or the air conditioning device 14. However, operation modes of the control device 16 are not limited to them.

Figure 6:
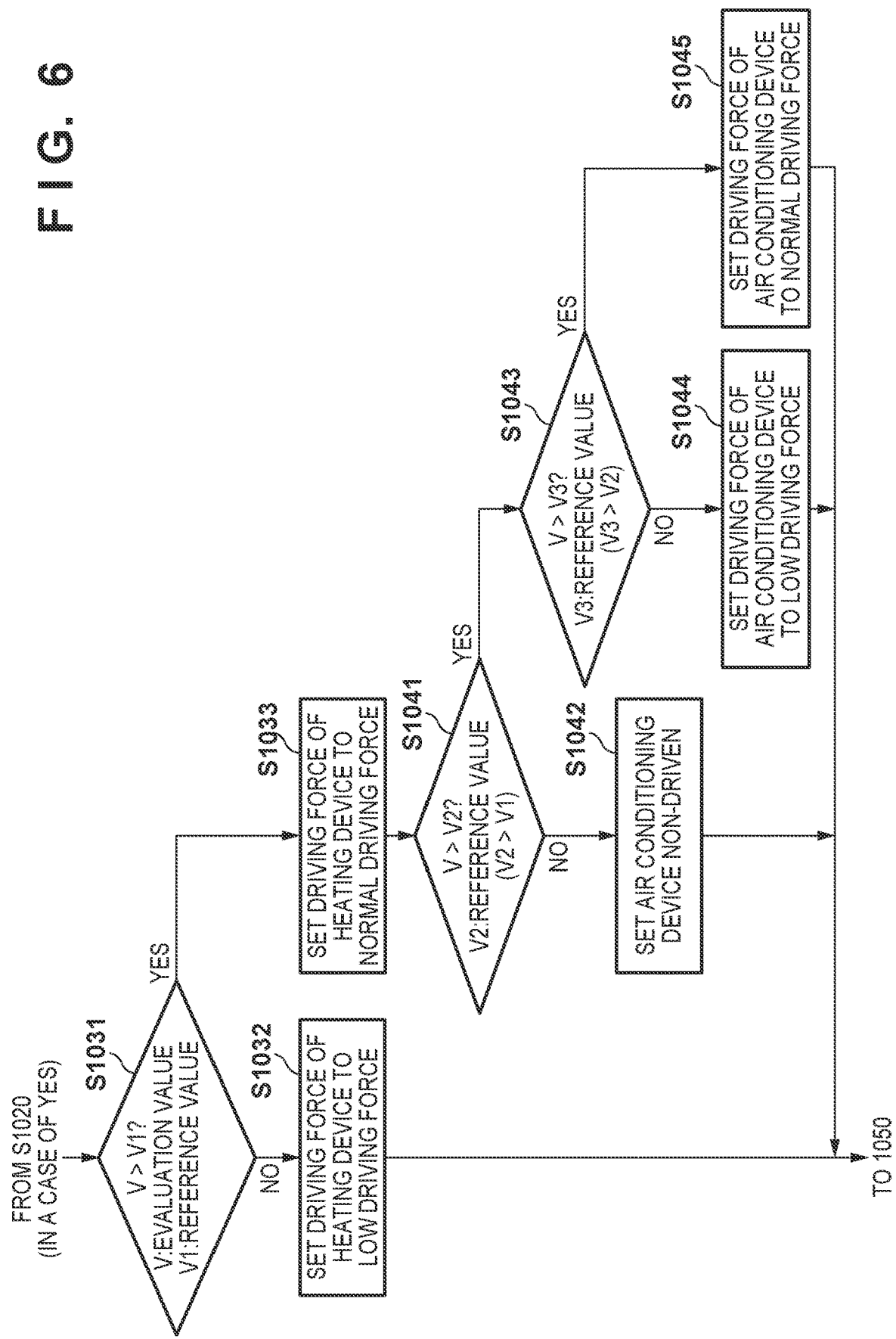
FIG. 6 is a flowchart illustrating an example of the content of control that is performed by the control device.

FIG. 6 is a flowchart showing the details of a setting method that is employed in S1030 to S1040 according to the above-described FIG. 5 regarding the driving force of the heating device 152 and/or the air conditioning device 14. S1030 is divided into S1031 to S1033, and S1040 is divided into S1041 to S1045.

In S1031, whether or not the evaluation value (evaluation value V) generated in S1010 is greater than a predetermined reference value V1 is determined. The reference value V1 is a value that is greater than a reference value that is used for the above-described determination in S1020, for example. As a result of the determination, if V≤V1 (V<V1) is satisfied, processing proceeds to S1032, and if V>V1 (V≥V1) is satisfied, processing proceeds to S1033. In S1032, the driving force of the heating device 152 is set to a low driving force ("heating device ON (low)" described with reference to FIG. 5). In S1033, the driving force of the heating device 152 is set to a normal driving force ("heating device ON" described with reference to FIG. 5).

In S1041, whether or not the evaluation value V is greater than a predetermined reference value V2 is determined. The reference value V2 is a value that is greater than the above-described reference value V1. As a result of the determination, if V≤V2 (V<V2) is satisfied, processing proceeds to S1042, and if V>V2 (V≥V2) is satisfied, processing proceeds to S1043. In S1042, the air conditioning device 14 is set so as not to be driven ("air conditioning device OFF" described with reference to FIG. 5).

In S1043, whether or not the evaluation value V is greater than a predetermined reference value V3 is determined. The reference value V3 is a value that is greater than the above-described reference value V2. As a result of the determination, if V≤V3 (V<V3) is satisfied, processing proceeds to S1044, and if V>V3 (V≥V3) is satisfied, processing proceeds to S1045. In S1044, the air conditioning device 14 is set to a low driving force ("air conditioning device ON (low)" described with reference to FIG. 5). In S1045, the driving force of the air conditioning device 14 is set to a normal driving force ("air conditioning device ON" described with reference to FIG. 5).

Thereafter, in S1050, driving control for the heating device 152 and/or the air conditioning device 14 is performed with the driving force that has been set as described above. Here, when evaluation is performed in S1010, the heating device 152 may be already in a driving state and/or the air conditioning device 14 may be already in an operating state, due to the user inputting an operation to the operation unit 19. In such a case, the driving force is set to whichever is greater, regardless of the above-described evaluation value. For example, when the above-described evaluation is performed, if the air conditioning device 14 is already in an operating state due to user setting, the air conditioning device 14 is kept in the state set by the user even if the evaluation value is "relatively small", and the setting is not to be changed to "air conditioning device OFF". Also, if the driving force(s) of the heating device 152 and/or the air conditioning device 14 has (have) been changed in S1030 to S1040, the driving force(s) is (are) returned to be in the original state thereof at the time when the drive control has not been performed, in S1070.

As described above, as shown in FIG. 5, the control device 16 has a plurality of operation modes that can be used to perform drive control on the heating device 152 and the air conditioning device 14. For example, the control device 16 has a mode for driving both the heating device 152 and the air conditioning device 14 (e.g. the heating device is ON and the air conditioning device is ON), and another mode in which the driving force of the air conditioning device 14 is smaller than the aforementioned mode (e.g. the heating device is ON and the air conditioning device is OFF/ON (low)). Air from the air conditioning device 14 may cause the occupant discomfort. For example, air from the air conditioner duct 141 may hit the occupant, which may cause the occupant discomfort. Also, noise of air from the defroster duct 142 may cause the occupant discomfort. However, according to the present embodiment, it is possible to provide comfortable space in the vehicle by avoiding unnecessarily driving the air conditioning device 14/by driving the air conditioning device 14 when necessary. Thus, the present embodiment makes it possible to effectively and relatively easily perform fog removal/fog prevention on the window member.

As described above, the air conditioning device 14 includes the air conditioner duct 141 and the defroster duct 142. Air from either the duct 141 or 142 can resolve the retention of air in the space SP1 and the effect of fog removal/fog prevention on the window member 12F can be achieved in either case. However, generally, air from the defroster duct 142 more effectively realizes fog removal/fog prevention. Therefore, in the above-described flowchart, it is preferable that air is sent out from the defroster duct 142 when the air conditioning device 14 is driven. If this is the case, for example, the amount of conditioned air from the defroster duct 142 is set in S1040, and the set amount of air is sent out from the defroster duct 142 in S1050.

In many cases, operation modes of the air conditioning device 14 may include an internal air circulation mode (a mode in which the air conditioning device 14 circulates the air inside the vehicle to perform air conditioning) and an external air introduction mode (a mode in which the air conditioning device 14 takes the air outside the vehicle into the vehicle to perform air conditioning). Although the above-described control performed by the control device 16 in the present embodiment may be employed in either the internal air circulation mode or the external air introduction mode, the external air introduction mode is preferably employed to more effectively realize the above-described fog removal/fog prevention.

In the embodiment, a camera is given as a preferable example of the monitoring device 151. However, the content of the embodiment is also applicable to other devices that are provided with a monitoring function. For example, fog on the window member 12F (such as water droplets adhering to the inner wall) changes the refraction index, which may cause a change in the monitoring area of the monitoring device 151. Therefore, the monitoring device 151 may be a radar (millimeter wave radar) or a LiDAR (Light Detection and Ranging). Also, the monitoring device 151 may be configured to monitor an area on the rear side or lateral side of the vehicle 1. For example, the content of the embodiment is also applicable to fog removal/fog prevention that is performed on the window member 12R.

Although some preferable embodiments have been described above, the present invention is not limited to them, and may be partially modified within the scope of the spirit of the present invention. For example, a part of one embodiment may be combined with another embodiment according to the purpose and so on. Also, the terms that indicate the elements in the present description are only used to illustrate the present invention. The present invention is not limited to the exact meanings of the terms, and includes equivalents thereof as well. For example, although the present description shows the vehicle 1 as a typical example, the content of each embodiment is applicable to vehicles that are not provided with wheels (e.g. ships), i.e. to various movable bodies.

Some features of the above-described embodiments can be summarized as follows:

A first aspect pertains to a movable body (e.g. 1), the movable body including: a monitoring device (e.g. 151) configured to monitor a surrounding environment of the movable body through a window member (e.g. 12F) that is light-transmissive and defines the inside and the outside of the movable body; a heating device (e.g. 152) configured to heat a portion (e.g. 12F1) of the window member within a monitoring area of the monitoring device; an air conditioning device (e.g. 14) configured to perform air conditioning in the movable body; and a control device (e.g. 16) configured to perform drive control on the heating device and the air conditioning device, wherein operation modes of the control device include: a first mode in which both the heating device and the air conditioning device are driven; and a second mode in which the driving force of the air conditioning device is smaller than that in the first mode (see FIG. 4), and the control device evaluates the degree of fog on the portion of the window member (e.g. S1010), and determines one of the operation modes based on the result of evaluation.

Thus, the present embodiment makes it possible to effectively and relatively easily perform fog removal/fog prevention on the window member. In particular, driving of the air conditioning device may cause the occupant discomfort. Therefore, it is possible to provide a comfortable space in the movable body by employing the first mode (driving the air conditioning device) when necessary.

According to a second aspect, the monitoring device includes: a detector (e.g. 1511) configured to detect the surrounding environment; and a base member (e.g. 1512, 1512b) that faces an inner wall of the window member, and is disposed such that a detection surface of the detector is located within a space (e.g. SP1) between the base member and the window member, and the space is in communication with a space in the movable body.

With this configuration, it is possible to let conditioned air to flow into the above-described space, and appropriately realize the above-described fog removal/fog prevention.

According to a third aspect, a defroster duct (e.g. 142) is provided in the movable body as a part of the air conditioning device, and in the first mode, the control device sends out air from the defroster duct.

Air sent out from the defroster duct may cause the occupant discomfort. According to the third aspect, it is possible to provide a comfortable space in the movable body by sending out air when necessary.

According to a fourth aspect, the control device performs the evaluation based on the result of monitoring received from the monitoring device.

With this configuration, it is possible to directly evaluate the degree of actual fog.

According to a fifth embodiment, the control device performs the evaluation based on the temperature outside the movable body.

With this configuration, it is possible to evaluate not only the degree of actual fog, but also the degree of fog that may be generated in the relatively near future.

According to a sixth embodiment, the control device performs the evaluation based on the humidity in the movable body.

With this configuration, it is possible to evaluate not only the degree of actual fog, but also the degree of fog that may be generated in the relatively near future.

According to a seventh aspect, the monitoring device is a camera (e.g. detector 1511) for monitoring an environment in front of the movable body, and the window member is a windshield (e.g. 12F).

That is to say, each of the above-described aspects is desirably applicable to a movable body (typically a vehicle) that is provided with a driving assistance function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A movable body comprising:
    a monitoring device configured to monitor a surrounding environment of the movable body through a window member that is light-transmissive and defines an inside and an outside of the movable body;
    a heating device configured to heat a portion of the window member within a monitoring area of the monitoring device;
    an air conditioning device configured to perform air conditioning in the movable body; and
    a control device configured to perform drive control on the heating device and the air conditioning device,
    wherein operation modes of the control device include:
        a first mode in which both the heating device and the air conditioning device are driven; and
        a second mode in which a driving force of the air conditioning device is smaller than that in the first mode, and
    the control device evaluates a degree of fog on the portion of the window member, and determines one of the operation modes based on the result of evaluation.

2. The movable body according to claim 1, wherein the monitoring device includes:
    a detector;
    a base member that faces an inner wall of the window member, and is disposed such that a detection surface of the detector is located within a space between the base member and the window member, and
    the space is in communication with a space in the movable body.

3. The movable body according to claim 1,
    wherein a defroster duct is provided in the movable body as a part of the air conditioning device, and
    in the first mode, the control device sends out air from the defroster duct.

4. The movable body according to claim 1,
    wherein the control device performs the evaluation based on the result of monitoring received from the monitoring device.

5. The movable body according to claim 1,
    wherein the control device performs the evaluation based on a temperature outside the movable body.

6. The movable body according to claim 1,
    wherein the control device performs the evaluation based on a humidity in the movable body.

7. The movable body according to claim 1,
    wherein the monitoring device is a camera for monitoring an environment in front of the movable body, and
    the window member is a windshield.

* * * * *